Patented Nov. 26, 1946

2,411,516

UNITED STATES PATENT OFFICE 2,411,516

ETHERS OF ENDOETHYLENE-SUBSTITUTED CYCLOPENTANOLS

Herman A. Bruson, Philadelphia, Pa., assignor to The Resinous Products & Chemical Company, Philadelphia, Pa., a corporation of Delaware No Drawing. Application May 24, 1944, Serial No. 537,183

8 Claims. (Cl. 260—611)

This invention relates to addition-rearrangement products from organic compounds having alcoholic hydroxyl groups and adducts of cyclopentadiene with mono-olefinic compounds having at least three carbon atoms, said products being ethers of an endoethylene-substituted cyclopentanol.

In my copending application, Serial No. 476,640, filed February 20, 1943, it is shown that non-resinous polycyclopentadienes having two double bonds per molecule, such as dicyclopentadiene, tricyclopentadiene, and tetracyclopentadiene add alcohols in the presence of acidic condensing agents to form addition-rearrangement products which are ethers of a new ring system termed the "nordicyclopentadiene" ring system.

In accordance with the present invention, which is a continuation-in-part of copending application Serial No. 529,195, filed April 1, 1944, adducts of cyclopentadiene with mono-olefinic compounds having at least three carbon atoms in the molecule are reacted with alcohols in the presence of acidic condensing agents to form addition products which are rearranged ethers from endo-ethylene-substituted cyclopentanols. A typical illustration is that, for example, involving the action of an alcohol, ROH, upon the cyclopentadiene-styrene adduct.

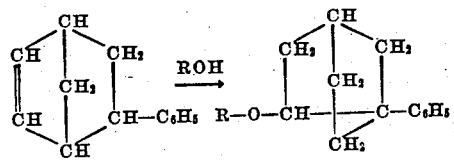

The product formed by the molecular addition-rearrangement is very probably that represented by formula (A). In any event, the product is not a simple addition of (R—O—) to one side of the double bond and of H to the other. The reaction involves both addition and rearrangement and leads to a new class of substituted cyclic compounds which are not available by any previously proposed method of synthesis.

Various adducts of cyclopentadiene with mono-olefinic compounds having three or more carbon atoms in the molecule may be used for the purpose of this invention. These comprise not only the so-called "Diels-Alder" type of adducts of cyclopentadiene with unsaturated hydrocarbons as, for example, propylene, cyclopentene, styrene, indene, allylbenzene, and the like, but also the adducts of cyclopentadiene with unsaturated alcohols, esters, halides, or ketones, as, for example, allyl alcohol, allyl chloride, allyl benzoate, allyl acetate, allyl oleate, vinyl methyl ketone, vinyl acetate, vinyl benzoate, and the like. There may also be used other adducts of cyclopentadiene with olefinic compounds, such as coumarone, safrole, eugenol, and with allyl ethers, such as benzyl allyl ether, phenyl allyl ether, octyl allyl ether, and the like.

In practicing this invention, it has been found that a wide variety of organic compounds containing one or more alcoholic hydroxyl groups may be employed. The hydroxyl group is preferably primary or secondary. Compounds containing a tertiary hydroxyl group may also be used, provided, however, that they are not readily dehydrated.

The useful alcoholic hydroxyl-containing compounds may be aliphatic, arylaliphatic, cycloaliphatic, hydroaromatic, or heterocyclic and may be saturated or unsaturated, straight- or branched-chained, or cyclic. It has also been established that the non-hydroxyl portion of the reacting hydroxyl-containing compound may contain a wide variety of groups or substituents, for example, halogen, cyano, thiocyano, nitro, keto or acyl, mercapto, ether, acyloxy, alkoxy, aryloxy, carbalkoxy, or carboxy groups, etc.

It should be noted at this point that, in the case of alcoholic hydroxyl-containing compounds having free carboxyl groups, excess cyclopentadiene-olefine adduct is necessary since esterification of the carboxyl group by addition and simultaneous rearrangement occurs in addition to etherification with the alcoholic hydroxyl group.

From the above discussion, it will be evident that under the influence of acidic condensing agents cyclopentadiene-olefine adducts of the type set forth form rearranged ethers with a wide variety of alcoholic hydroxyl-containing compounds and that the reaction is one of wide applicability. Hydroxyl-containing reactants of perhaps greatest interest belong to the general class of unsubstituted alcohols, whether monohydric or polyhydric, which are not dehydrated at 60° C. by sulfuric acid. There are, however, important types of reactants other than the simple alcohols. Other important groups include hydroxy-acid esters, hydroxy-acids, hydroxy-ketones, hydroxy-lactones, hydroxy-aldehydes, ether alcohols, cyano alcohols, thiocyano alcohols, halohydrins, nitro alcohols, and polymeric hydroxyl-containing compounds, including polyvinyl alcohol, polysaccharides, starches, sugars, cellulose, cellulose ethers, cellulose esters, and the like.

Typical useful hydroxyl-containing compounds for the purpose of this invention are the following: methanol, ethanol, propanol, isopropanol, n-butanol, isobutanol, butanol-2, the primary and various isomeric amyl alcohols, n-hexanol, 2-ethylbutanol, n-heptanol, n-octanol, capryl alcohol, 2-ethyl hexanol, decanol, 5-ethyl-nonanol-2, dodecyl alcohol, tetradecanol, 7-ethyl-2-methyl-undecanol-4, cetyl alcohol, 3,9-diethyl-tridecanol-6, oleyl alcohol, n-octadecanol, allyl alcohol, crotonyl alcohol, cinnamyl alcohol, geraniol, phenylethyl alcohol, methoxyethanol, ethoxyethanol, butoxyethanol, phenoxyethanol, ethylene glycol, propylene glycol, butylene glycol-1,3, diethylene glycol, triethylene glycol, polyethylene glycols, di-isopropylene glycol, diethylene glycol monoethyl ether, diethylene glycol monobutylether, diethylene glycol monophenylether, glycerol, glycerol monochlorohydrin, glycerol dichlorohydrin, glyceryl-α-phenyl ether, 2 - ethyl - hexandiol - 1,3, glyceryl - α,γ-dimethyl ether, trimethylene glycol, tetramethylene glycol, decamethylene glycol-1,10, pentaerythritol, ethylene chlorohydrin, propylene chlorohydrin, ethylene bromohydrin, propargyl alcohol, ethylene cyanohydrin, p - thiocyanophenoxyethanol, 2-nitro-2-methyl-1-propanol, β - thiocyanoethoxyethanol, p - tertiary-butylphenoxyethanol, o - cyclohexylphenoxyethanol, 2,4-dichlorophenoxyethanol, p - ter - octylphenoxyethanol, p-phenylphenoxyethanol, β-naphthoxyethanol, 2 - nitrophenoxyethanol, p - acetylphenoxyethanol, p-benzoylphenoxyethanol, cyclohexanol, o-, m-, or p-methylcyclohexanol, cyclopentanol, o- or p-cyclohexyl-cyclohexanol, p-tert-amylcyclohexanol, hydroxydihydronordicyclopentadiene, borneol, fenchol, cholesterol, ethyl glycolate, ethyl lactate, dimethyl tartrate, ethyl citrate, benzyl alcohol, 2-nitro-2-methyl-1,3-propanediol, ethyl-10-hydroxy-stearate, tetrahydrofurfuryl alcohol, phenyl thioethanol, ceryl alcohol, 2-nitro-2-ethyl-1,3-propanediol, castor oil, hydrogenated castor oil, ethyl ricinoleate, ethyl maleate, sorbitol, dibutyl tartrate, glyceryl-α,γ-diphenyl ether, mannitol, ethylene glycol monobenzylether, and many others. The hydroxyl-containing compound need not be pure. There may be used, for instance, technical alcohol mixtures such as are obtained as by-products from the synthetic production of methanol by the reaction of hydrogen and carbon monoxide and known as "higher alcohols from the methanol synthesis." These comprise branched-chained primary and secondary alcohols having from about 7 to about 18 carbon atoms and in some cases even more. Mixtures of higher aliphatic alcohols obtained by the catalytic hydrogenolysis of fatty glycerides or of higher fatty acid esters may likewise be used.

Among the acidic condensing agents or catalysts which serve to promote the addition-rearrangement of alcoholic hydroxyl-containing compounds with cyclopentadiene mono-olefines of the type set forth are boron trifluoride and its coordination complexes with oxygenated compounds, such as ethers, as, for example, $BF_3.C_3H_7OC_3H_7$; carboxylic acids, as $$BF_3.2CH_3COOH$$

carboxylic esters, as $BF_3.CH_3COOC_2H_5$; ketones, such as $BF_3.CH_3COCH_3$; alcohols, such as $BF_3.2C_4H_9OH$; and water, such as $BF_3.(H_2O)_x$ where $x$ is one or two. There may also be used as a catalyst sulfuric acid, its esters, such as ethyl acid sulfate, aromatic sulfonic acids, such as toluene sulfonic acid, or aliphatic sulfonic acids, as butylsulfonic acid and the like.

Sulfuric acid is of particular value in promoting reactions involving the lower primary aliphatic alcohols. It is generally of use in the case of other alcohols also, which are not readily polymerized or dehydrated by the presence of concentrated sulfuric acid.

The boron trifluoride group of catalysts is one of considerable value. Of these, the complexes with ethers are of particular utility since they are soluble in the reaction mixtures and produce no troublesome by-products. Typical of these complexes are $BF_3.C_2H_5$—O—$C_2H_5$ and $BF_3.C_4H_9$—O—$C_4H_9$, with diethyl ether and di-n-butyl ether, respectively.

The quantity of active catalyst employed may be varied over a wide range. Good results have been obtained with as little as two per cent of catalyst, based on the weight of the cyclopentadiene adduct, up to and exceeding a molar equivalent of the catalyst per mol of adduct used. The catalysts need not be used under anhydrous conditions. In fact, the presence of water in small amounts often increases the rate of reaction.

The addition-rearrangement reaction involving an alcoholic hydroxyl-containing compound and the adduct of cyclopentadiene and a mono-olefinic compound is readily carried out in the presence of one or more acidic condensing agents. The reaction may be initiated by mixing the components and catalyst at room temperature, at temperatures even around 0° C. in some cases, or at elevated temperatures. While it is generally desirable to control the temperature at the start, the reaction may be carried to completion either by continuing the reaction for a long time or by raising the temperature to accelerate the reactions involved. Temperatures as high as 100° C. to about 200° C. may thus be used. The reaction range of about 50° to 125° C. is, however, generally the most useful and is to be preferred.

In some cases the reactions are sufficiently exothermic that it is desirable to cool the reacting mixture in order to control the reaction. This may also be controlled by the rate of mixing the reactants and by the use of a solvent or diluent such as ethylene dichloride or dioxane.

After the reaction has been carried to a desired point, the acidic condensing agent is removed, as by washing with water or by neutralization. The reaction product may then be distilled in many cases, or otherwise purified, as by treatment with decolorizing clay or carbon, stripping, extraction, etc.

The following examples illustrate this invention, it being understood that the proportions, temperatures and time can be varied to a considerable extent without departing from the spirit of the invention.

For the purpose of this invention it is desirable, although not necessary, to employ not more than one mol equivalent of the alcohol per mol of the adduct.

*Example 1*

A mixture of 4 g. of $BF_3.O(C_4H_9)_2$ 108 g. of ethylene chlorohydrin and 134 g. of the cyclopentadiene-allyl phenyl ether adduct

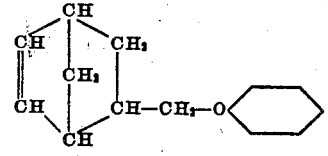

was stirred at 95° C. for six hours. The product was washed with dilute sodium hydroxide solution, then with water, dried, and distilled in vacuo to yield 138 g. of the β-chloroethoxy endoethylene phenoxymethyl cyclopentane as a colorless oil boiling at 166°–169° C./1 mm. having the probable formula

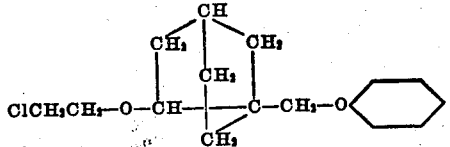

The cyclopentadiene-allyl phenyl ether adduct used is a colorless oil boiling at 134° C./6 mm. obtainable by heating cyclopentadiene or dicyclopentadiene with allyl phenyl ether at 170°–180° C. as described in copending application Serial No. 529,196, filed April 1, 1944.

Example 2

A mixture of 9.6 g. of methanol, 2 g. of 95% sulfuric acid, and 17 g. of the cyclopentadiene-styrene adduct

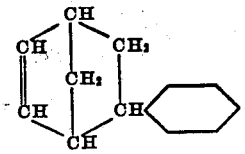

known as 2,5-endomethylene-1,2,5,6-tetrahydrodiphenyl was boiled under reflux for seven hours at 72°–81° C. The product was washed with dilute sodium hydroxide solution, then with water, dried, and distilled in vacuo.

The rearranged methyl ether of phenyl endoethylene cyclopentanol having the probable formula

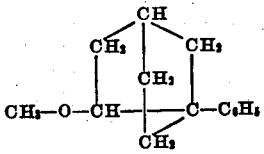

distilled over at 135°–148° C./10 mm. as a colorless oil. Upon redistillation the pure compound boiled at 140°–145° C./10 mm.

Example 3

A mixture of 16 g. of ethylene chlorohydrin, 1 g. of BF$_3$.O(C$_4$H$_9$)$_2$, and 17 g. of 2,5-endomethylene - 1,2,5,6 - tetrahydrodiphenyl was stirred at 95°–97° C. for four hours. The product was washed with sodium carbonate solution and water, dried, and distilled in vacuo.

The β-chloroethyl ether of phenyl endoethylene cyclopentanol having the probable formula

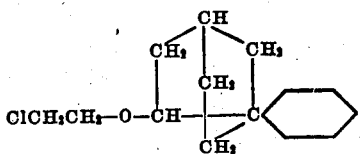

distilled over at 160°–170° C./1 mm. as a colorless oil. Upon redistillation the pure compound boiled at 148°–152° C./0.5–1 mm.

Example 4

A mixture of 31 g. of ethylene glycol (0.5 mol), 2 g. of BF$_3$.O(C$_4$H$_9$)$_2$, and 31 g. of 2,5-endomethylene-1,2,5,6-tetrahydrodiphenyl was stirred at 95°–97° C. for seven hours. The product was washed with sodium hydroxide solution and with water, then dried, and distilled in vacuo. The β-hydroxyethyl ether of phenyl endoethylene cyclopentanol having the probable formula

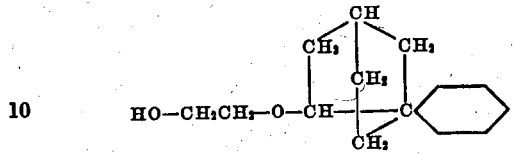

distilled over at 160°–163° C./2 mm. as a colorless oil in a yield of 17 g. Upon redistillation the pure compound boiled at 153°–163° C./1 mm.

Example 5

A mixture of 11.6 g. of allyl alcohol, 1 g. of BF$_3$.O(C$_2$H$_5$)$_2$, and 17 g. of 2,5-endomethylene-1,2,5,6-tetrahydro-diphenyl was heated at 90° C. for four hours. The product was worked up as in Example 3. The allyloxy phenyl endothylene cyclopentane having the probable formula

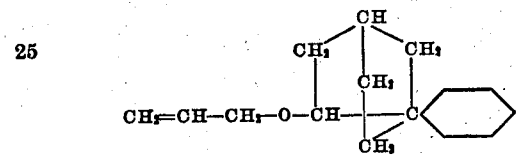

distilled over at 155°–170° C./10 mm. as a colorless oil. Upon redistillation the pure compound boiled at 164°–168° C./10 mm.

Example 6

A mixture of 3 g. of BF$_3$.O(C$_4$H$_9$)$_2$, 64 g. of ethylene chlorohydrin and 90 g. of cyclopentadiene-allylbenzoate adduct was stirred at 97° C. for eight hours. The product was washed with dilute soda solution, then with water, dried, and distilled in vacuo to yield 96 g. of the β-chloroethoxy derivative as a viscous oil boiling at 195°–200° C./1–2 mm. having the probable formula

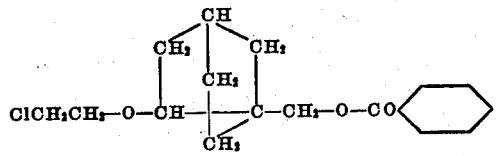

Example 7

A mixture of 11.9 g. of 2-nitro-2-methyl-1-propanol, 0.5 g. of BF$_3$.O(C$_2$H$_5$)$_2$, and 17 g. of 2,5- endomethylene - 1,2,5,6 - tetrahydrodiphenyl was stirred at 90° C. for three hours. The product was washed with water, dried, and distilled in vacuo.

The nitro-isobutyloxy-phenyl endoethylene cyclopentane having the probable formula

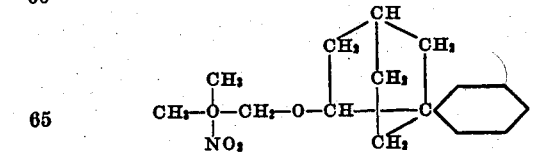

boiled at 180°–183° C./11 mm. It was a pale yellow oil.

Example 8

A mixture of 17 g. of 2,5-endomethylene-1,2,5,6-tetrahydrodiphenyl, 14.7 g. of β-thiocyanoethoxyethanol, and 3 g. of BF$_3$.O(C$_4$H$_9$)$_2$ was stirred at 95° C. for seven hours. The product was washed with dilute soda solution and water, then distilled in vacuo. The thiocyanoethoxy-ethoxy-phenyl endoethylene cyclopentane having the probable formula

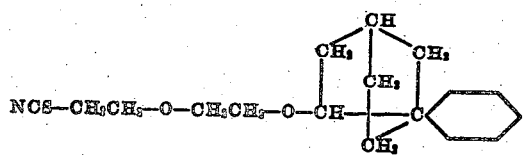

distilled over at 225°–235° C./2 mm. as a viscous pale yellow oil. Upon redistillation the pure compound boiled at 222°–227° C./1.5 mm.

Example 9

A mixture of 3 g. of $BF_3.O(C_2H_5)_2$, 100 g. of ethylene chlorohydrin and 160 g. of the cyclopentadiene-p-tert.-butylphenyl allyl ether adduct

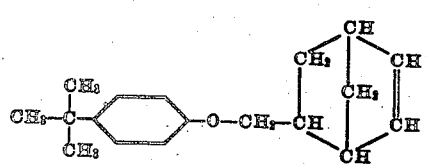

was stirred at 95° C. for six hours. The product was washed with dilute sodium hydroxide solution, then with water, dried, and distilled in vacuo to yield 160 g. of the β-chloroethoxy derivative as a colorless oil boiling at 185°–195° C./0.5–1 mm. having the probable formula

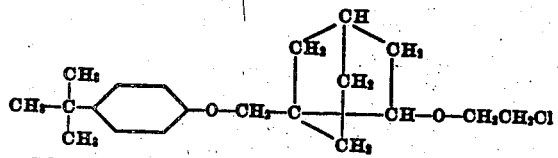

The cyclopentadiene-p-tertiary butylphenyl allyl ether adduct used above is a low melting solid boiling at 140° C./1 mm. obtained by heating cyclopentadiene or dicyclopentadiene with p-tertiary butylphenyl allyl ether at 170°–175° C.

Example 10

To a mixture of 80.5 g. of ethylene chlorohydrin and 88.5 g. of cyclopentadiene-β-allyloxypropionitrile adduct

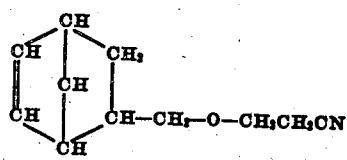

there was added 4 g. of $BF_3.O(C_4H_9)_2$ and the mixture stirred at 95°–97° C. for seven hours. The product was washed with dilute sodium hydroxide solution, then with water, dried, and distilled in vacuo.

The β-chloroethoxy derivative obtained boiled at 164°–169° C./1 mm. It was a colorless thick oil, having the probable formula

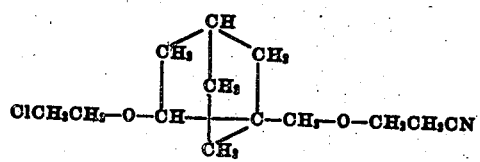

The yield amounted to 74 grams.

Example 11

A mixture of 24 g. of ethyl lactate, 17 g. of 2,5-endomethylene-1,2,5,6-tetrahydro-diphenyl and 2 g. of $BF_3.O(C_4H_9)_2$ was stirred at 95° C. for six hours. The product was washed with water and with dilute soda solution and then distilled in vacuo.

The ether ester having the probable formula

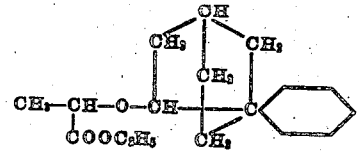

distilled over at 160°–170° C./1.5–2 mm. as a colorless oil.

Example 12

A mixture of 5 g. of $BF_3.O(C_4H_9)_2$, 160 g. of ethylene chlorohydrin, and 168 g. of the cyclopentadiene-allyloxyethanol adduct

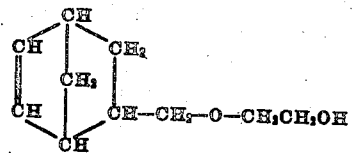

was stirred at 95° C. for eight hours. The product was washed with dilute sodium hydroxide solution, then with water, dried, and distilled in vacuo to yield 89 g. of the β-chloroethoxy derivative as a colorless oil boiling at 162°–165° C./0.5–1 mm. having the probable formula

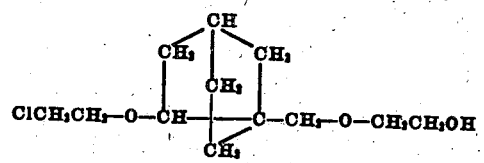

Example 13

A mixture of 24.9 g. of β-chloroethoxyethanol, 17 g. of 2,5-endomethylene-1,2,5,6-tetrahydrodiphenyl, and 1 g. of $BF_3.O(C_4H_9)_2$ was stirred at 95° C. for four hours and worked up by washing with soda solution and with water, followed by vacuum distillation.

The product having the probable formula

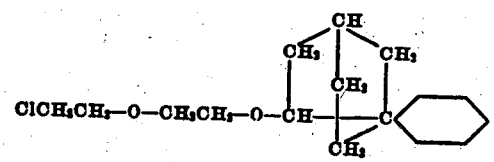

distilled over at 180°–185° C./1.5 mm. as a colorless viscous oil.

Example 14

A mixture of 22 g. of glyceryl-α-monochlorohydrin, 17 g. of 2,5-endomethylene-1,2,5,6-tetrahydro-diphenyl, and 1 g. of $BF_3.O(C_4H_9)_2$ was stirred at 90°–95° C. for four and one-half hours, then cooled, washed with dilute sodium hydroxide solution and water, and distilled in vacuo.

The product having the probable formula

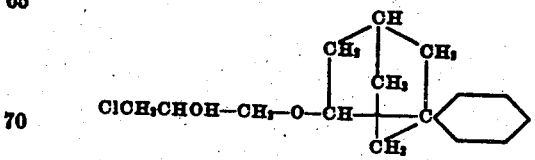

boiled at 190°–195° C./2 mm. It is a thick oil.

Example 15

A mixture of 35.4 g. of n-butoxyethanol ("butyl Cellosolve"), 17 g. of 2,5-endomethylene-1,2,5,6-tetrahydro-diphenyl, and 3 g. of $$BF_3 \cdot O(C_4H_9)_2$$

was stirred at 95°–97° C. for seven hours. The product was washed with dilute sodium hydroxide solution, then with water, and distilled in vacuo. The n-butoxyethoxy endoethylene phenyl cyclopentane having the probable formula

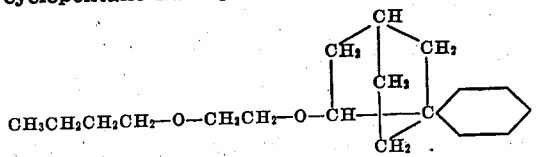

distilled at 175°–180° C./1.5 mm. as a colorless oil in a yield of 20 grams.

Example 16

A mixture of 10.6 g. of diethylene glycol, 34 g. of 2,5-endomethylene-1,2,5,6-tetrahydro-diphenyl, and 3 g. of $BF_3 \cdot O(C_4H_9)_2$ was stirred for seven hours at 85°–90° C. and worked up as in Example 15.

Two products were obtained. One product was a colorless oil boiling at 200°–210° C. at 12 mm. having the probable formula

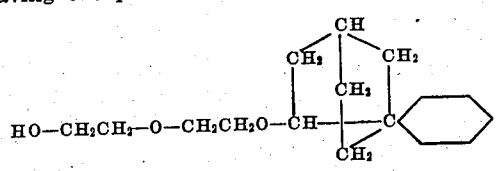

The other product was a thick oil boiling at 285°–290° C./1.5 mm. having the probable formula

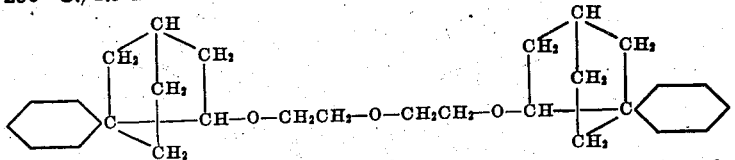

This example illustrates the fact that in the case of polyhydric alcohols one or more of the alcoholic hydroxyl groups may be reacted to give one or more ether linkages to an endoethylene cyclopentane ring system.

Example 17

A mixture of 5 g. of $BF_3 \cdot O(C_4H_9)_2$, 101 g. of ethylene chlorohydrin, and 158 g. of the cyclopentadiene-safrole adduct

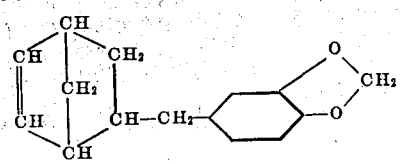

was stirred at 95° C. for eight and one-half hours. The product was washed with dilute potassium hydroxide solution, then with water, dried, and distilled in vacuo to yield 110 g. of the β-chloroethoxy derivative as a pale yellow oil boiling at 180°–190° C./1–2 mm. having the probable formula

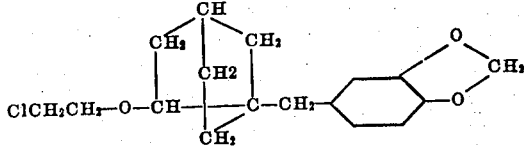

The cyclopentadiene-safrole adduct used above is a colorless oil boiling at 130°–135° C./1 mm. obtained by heating cyclopentadiene or dicyclopentadiene with safrole at 170°–180° C.

Example 18

A mixture of 6 g. of $BF_3 \cdot O(C_4H_9)_2$, 160 g. of ethylene chlorohydrin, and 148 g. of cyclopentadiene-vinyl acetate adduct

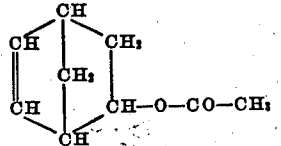

was stirred at 95° C. for five and one-half hours. The product was cooled, washed with dilute soda solution, then with water, dried, and distilled in vacuo to yield 85 g. of the rearranged ether as a colorless oil boiling at 108°–115° C./1 mm. having the probable formula:

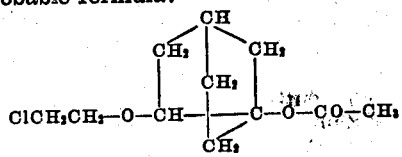

Example 19

A mixture of 5 g. of $BF_3 \cdot O(C_4H_9)_2$, 36 g. of ethylene cyanohydrin, and 55 g. of cyclopentadiene-indene adduct

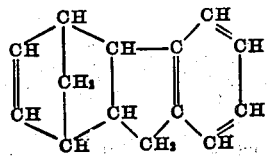

was stirred at 95° C. for four hours. The product was washed with water, dried, and distilled in vacuo to yield 50 g. of the rearranged cyanoethyl ether as a colorless oil boiling at 174°–176° C./2 mm. having the probable formula

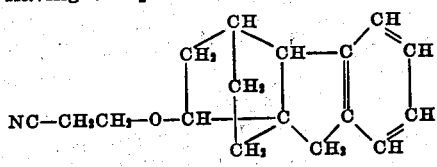

Example 20

A mixture of 10 g. of $BF_3 \cdot O(C_4H_9)_2$, 92 g. of glycerol, and 55 g. of cyclopentadiene-indene adduct was stirred at 90°–95° C. for eight hours. The product was washed with dilute sodium hydroxide solution, then with water, dried, and distilled in vacuo to yield 42 g. of the rearranged glyceryl mono-ether as a colorless oil boiling at 200° C./0.5 mm. having the probable formula

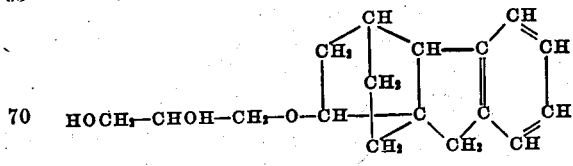

Example 21

A mixture of 60 g. of ethylene chlorohydrin, 5 g. of $BF_3 \cdot O(C_4H_9)_2$, and 91 g. of cyclopentadiene-indene adduct heated at 95° C. for five hours yielded 102 g. of the β-chloroethyl ether of endoethylene hydroxycyclopentanoindane as a colorless oil boiling at 155°–157° C./1 mm. having the probable formula

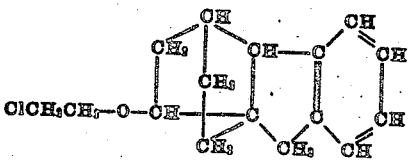

Example 22

A mixture of 6 g. of BF₃.O(C₄H₉)₂, 54 g. of benzyl alcohol, and 55 g. of cyclopentadiene-indene adduct was stirred at 95° C. for seven and one-quarter hours and worked up as above.

The benzyl ether of endoethylene-hydroxycyclopentanoindane distilled over at 190°–200° C./1 mm. as a colorless oil, in a yield amounting to 49 g., having the probable formula

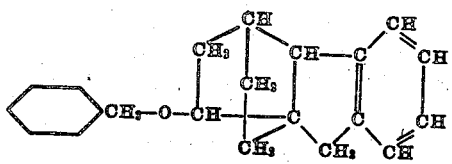

Example 23

A mixture of 51 g. of tetrahydro-furfuryl alcohol, 6 g. of BF₃.O(C₂H₅)₂, and 55 g. of cyclopentadiene-indene adduct was heated six and one-quarter hours at 90°–95° C. and yielded the tetrahydro-furfuryl ether of endoethylene-hydroxycyclopentanoindane as a colorless oil boiling at 169°–173° C./0.5 mm. having the probable formula:

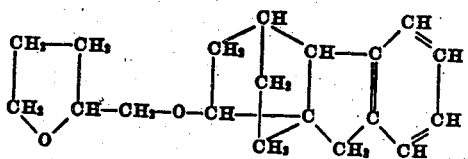

Example 24

A mixture of 50 g. of cyclohexanol, 7 g. of BF₃.O(C₄H₉)₂, and 55 g. of cyclopentadiene-indene adduct heated seven hours at 95° C. yielded the cyclohexyl ether of endoethylene-hydroxycyclopentanoindane as a colorless oil boiling at 164°–166° C./0.5 mm.

Example 25

A mixture of 3 g. of BF₃.O(C₂H₅)₂, 48.6 of ethylene chlorohydrin, and 92 g. of cyclopentadiene adduct of 2,4,5-trichlorophenyl allyl ether

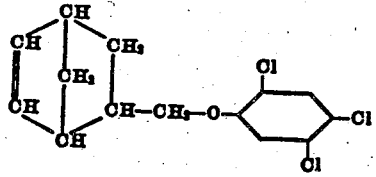

was stirred for six hours at 95° C. The product was washed with dilute sodium hydroxide, then with water, dried, and distilled in vacuo to yield 88 g. of a colorless oil boiling at 210°–213° C./0. mm. having the probable formula

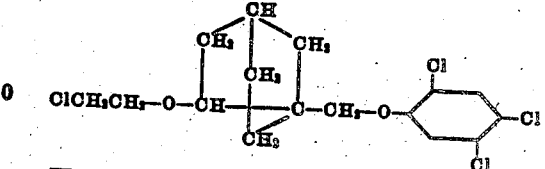

The products obtained according to this invention are of potential value as intermediates for the preparation of resins, plasticizers, insecticides, and pharmaceuticals.

I claim:

1. As a new compound, an acid-catalyzed addition-rearrangement product of an aliphatic alcohol and an adduct of cyclopentadiene with styrene, said product being an ether of endoethylene-substituted phenyl cyclopentanol.

2. As a new compound, an acid-catalyzed addition-rearrangement product of an aliphatic chloro alcohol and an adduct of cyclopentadiene with styrene, said product being a chloro alkyl ether of endoethylene-substituted phenyl cyclopentanol.

3. As a new compound, an acid-catalyzed addition-rearrangement product of ethylene chlorohydrin and the cyclopentadiene-styrene adduct, said product being a chloroethyl ether of endoethylene-substituted phenyl cyclopentanol.

4. As a new compound, an acid-catalyzed addition-rearrangement product of β-chloroethoxyethanol and cyclopentadiene-styrene adduct, said product being a β-chloroethoxyethyl ether of endoethylene-substituted phenyl cyclopentanol.

5. A method for preparing a chloroalkyl ether of endoethylene phenyl cyclopentanol, which comprises reacting in the presence of an acidic condensing agent an aliphatic chloro alcohol with the adduct of cyclopentadiene and styrene.

6. A method for preparing ethers which comprises reacting in the presence of an acidic condensing agent an aliphatic alcohol with the adduct of cyclopentadiene and styrene.

7. A method for preparing ethers which comprises reacting in the presence of a boron trifluoride catalyst an aliphatic alcohol with the adduct of cyclopentadiene and styrene.

8. As a new compound, an acid-catalyzed addition-rearrangement product of glyceryl monochlorohydrin and cyclopentadiene-styrene adduct, said product being a γ-choro-β-hydroxypropyl ether of endoethylene-substituted phenyl cyclopentanol.

HERMAN A. BRUSON.